United States Patent [19]

Gulick et al.

[11] Patent Number: 5,266,950
[45] Date of Patent: Nov. 30, 1993

[54] PROGRAMMABLE KEYPAD MONITOR

[75] Inventors: Dale Gulick; Alan Hendrickson, both of Austin, Tex.

[73] Assignee: Advanced Micro Devices, Inc., Sunnyvale, Calif.

[21] Appl. No.: 942,359

[22] Filed: Sep. 9, 1992

Related U.S. Application Data

[63] Continuation of Ser. No. 564,048, Aug. 8, 1990, abandoned.

[51] Int. Cl.$^5$ .......................................... H03M 11/00
[52] U.S. Cl. .................................... 341/22; 341/24
[58] Field of Search ............... 364/189, 200, 900; 341/22, 26, 24, 25; 379/96, 97, 90, 283; 200/175

[56] References Cited

U.S. PATENT DOCUMENTS

| | | | |
|---|---|---|---|
| 4,497,021 | 1/1985 | Fukuda | 364/200 |
| 4,532,497 | 7/1985 | Danish | 341/22 |
| 4,538,146 | 8/1985 | Morris | 341/26 |
| 4,583,189 | 4/1986 | Koyama | 341/26 |
| 4,673,933 | 6/1987 | Bauer | 341/22 |
| 4,885,580 | 12/1989 | Noto | 379/96 |
| 5,008,927 | 4/1991 | Weiss | 379/97 |

FOREIGN PATENT DOCUMENTS 0096435  4/1990  Japan ..................... 341/26

OTHER PUBLICATIONS

Harring, Keyboard with Integral Pin Pad Attachment, Nov. 1977.

*Primary Examiner*—John K. Peng
*Assistant Examiner*—Robert Gray
*Attorney, Agent, or Firm*—Foley & Lardner

[57] ABSTRACT

A keypad monitor implemented in an integrated circuit monitors the closure of a plurality of keypad switches coupled to input terminals of the integrated circuit. The keypad monitor is operative in a first mode for monitoring a first number of the input terminals and a second mode for monitoring a lesser number of input terminals. When in the second mode, the unmonitored input terminals are converted for a use not related to keypad monitoring.

7 Claims, 6 Drawing Sheets

PROGRAMMABLE KEYPAD MONITOR

This is a continuation of application Ser. No. 07/564,048 filed Aug. 8, 1990.

BACKGROUND OF THE INVENTION

The present invention generally relates to a keypad monitor and more particularly to a programmable keypad monitor which accommodates keypads having different numbers of keys. The present invention still more particularly relates to such a keypad monitor which is implemented in integrated circuit form and wherein, through its programmability, efficient use may be made of the integrated circuit pins when keypads of reduced size are to be monitored. The keypad monitor of the present invention disclosed herein is incorporated into a hands-free, multiple feature telephone unit adapted for use in an Integrated Services Digital Network (ISDN).

Keypads and monitors associated therewith are well known in the art. Such keypads generally include an array of switches with each switch coupled between a respective different pair of first and second conductors. When a keypad switch is depressed or closed, a condition can then be sensed across the first and second conductors to which a particular switch is coupled to identify which switch is being depressed. Such condition sensing is performed by the keypad monitor.

Keypad monitors for identifying a particular keypad switch being closed have been implemented in integrated circuit form. Such integrated circuits generally include a plurality of input terminal pins including a first group of terminal pins for connection to the first keypad conductors and a second group of terminal pins for connection to the second keypad conductors. The integrated circuits further generally include internal circuitry which scan the terminal pins for detecting the closure of a keypad switch.

The number of terminal input pins carried by these integrated circuits has been dictated by the number of keypad switches to be monitored. For example, if thirty-six keypad switches are to be monitored, these integrated circuits will include a first group of six input terminal pins and a second group of six input terminal pins. This arrangement is then capable of supporting the monitoring of thirty-six keypad switches arranged in a six-by-six matrix of keypad switches.

In the integrated circuit industry, the cost of producing an integrated circuit device is largely dependant upon the number of such integrated circuits to be produced. Hence, if one integrated circuit is able to function properly in a number of different applications, an economy of scale may be realized in producing the device. This not only lowers the per unit production cost of the device, but also lowers the per unit price for the device paid by the ultimate user.

The cost of an integrated circuit device is also dependant upon the number of terminal pins which must be incorporated with the device. As the number of terminal pins increases, the cost of the device correspondingly increases. Hence, in order to provide maximum functionality for a device, a device should preferably be designed to make efficient use of each terminal pin regardless of its application.

The present invention takes both of these important economic factors into account in providing an improved keypad monitor in integrated circuit form. First, the keypad monitor is programmable to support a full-sized keypad and a smaller-sized keypad. When programmed for monitoring the smaller-sized keypad, the terminal pins which are not utilized for connection to the first and second conductors are converted for other useful functions independent of the keypad switch monitoring function.

SUMMARY OF THE INVENTION

The invention therefore provides a keypad monitor for monitoring the closure of a plurality of keypad switches arranged between a plurality of first and second conductors. The keypad monitor is implemented in an integrated circuit including a plurality of monitor input terminals with each monitor input terminal being arranged to be coupled to a respective different one of the first and second conductors. The keypad monitor is also of the type which senses a condition at each of the monitor input terminals for identifying a closed keypad switch. The keypad monitor includes mode select means for selecting a first or second monitor operating mode and terminal scanning means responsive to the mode select means for sensing for the condition at a first set of the monitor input terminals responsive to the first mode being selected and for sensing for the condition at a second set of the monitor input terminals responsive to the second mode being selected.

The present invention further provides a keypad monitor for monitoring the closure of a plurality of keypad switches arranged between a plurality of first and second conductors, wherein the keypad monitor is implemented in an integrated circuit including a plurality of monitor input terminals with each monitor input terminal being arranged to be coupled to a respective different one of the first and second conductors, and wherein the keypad monitor is also of the type which senses a condition at each of the monitor input terminals for identifying a closed keypad switch. The keypad monitor includes mode select means for selecting a first or second monitor operating mode for accommodating connection of the keypad monitor with a first size keypad or with a second (smaller) size keypad and terminal scanning means responsive to the mode select means selecting the first mode for sensing for the condition at all of the monitor input terminals and responsive to the mode select means selecting the second mode for sensing for the condition at less than all of the monitor input terminals and converting the remaining ones of the monitor input terminals for use unrelated to identifying a closed keypad switch.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings in the several figures of which like reference numerals identify identical elements and wherein:

DESCRIPTION OF THE PREFERRED EMBODIMENT

Figure 1:
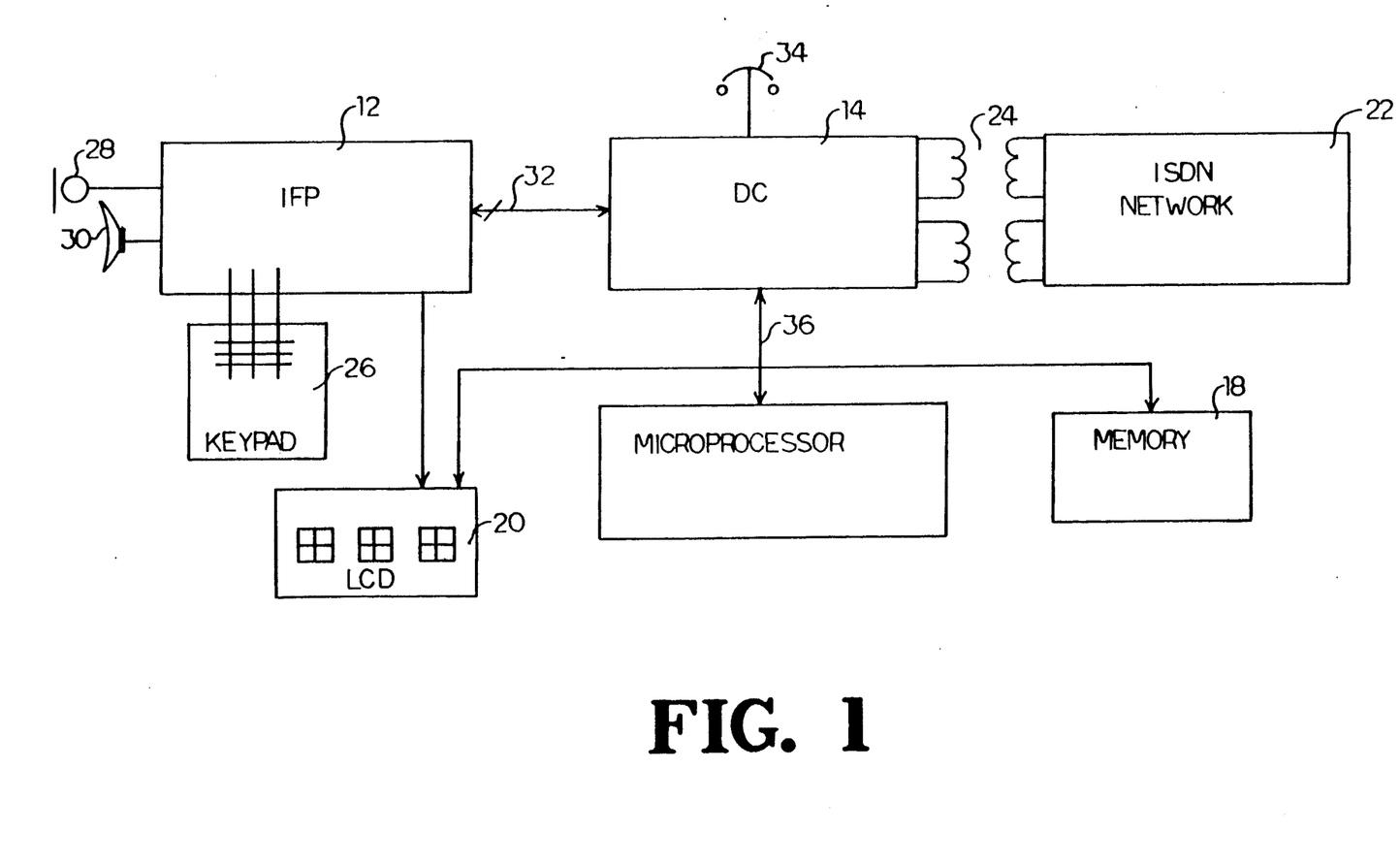
FIG. 1 is a block diagram of an ISDN telephone system including an ISDN hands-free, multiple feature telephone unit embodying the present invention.

Referring now to FIG. 1, it illustrates in block diagram form, an ISDN telephone system 10 embodying the present invention. The system 10 generally includes a hands-free, multiple feature telephone unit 12, a digital controller 14, a microprocessor 16, a memory 18, and a liquid crystal display unit 20. The system 10 is transformer-coupled to an ISDN network 22 by a transformer 24.

The telephone unit 12 is coupled to a keypad 26 in a manner to be described in greater detail hereinafter. To that end, as will also be seen hereinafter, the unit 12 includes a keypad monitor embodying the present invention for monitoring the keypad and identifying a particular key being depressed. Depression of the keys of the keypad 26 may be made for dialing a telephone number or for activating or deactivating particular features of the telephone unit 12. Also coupled to the unit 12 is a microphone 28 which serves to convert audible speech to analog voltage form and a loudspeaker 30 which serves to convert analog voltages representative of human speech to audible sound. The microphone 28 and speaker 30 may, of course, be contained in the same housing as the telephone unit 12. As will also be seen hereinafter, the telephone unit 12 includes an audio processor which converts the analog voltages produced by the microphone 28 representative of audible speech to output digital signals and which also converts input digital signals representative of human speech to analog voltages for conversion to audible sound by the speaker 30.

The telephone unit 12 is coupled to the digital controller 14 by a four-conductor bus. The bus 32 is preferably of the type well known in the art as an IOM-2 bus (IOM is a trademark of Siemens AG). The bus will be described in greater detail with respect to FIG. 2. It basically provides a serial digital interface between the telephone unit 12 and the digital controller 14.

The digital controller 14 provides a digital interface between the telephone unit 12 and the bus 32 to the ISDN network 22 and the microprocessor 16. The digital controller is preferably the Am79C30A Digital Subscriber Controller available from Advanced Micro Devices, Inc., the assignee of the present invention, and is well known in the art. It provides, in addition to the digital interface function, a CODEC transceiver function to support the use of a standard telephone handset 34 coupled thereto to enable the telephone user to communicate over the ISDN network 22 from the standard handset 34.

The microprocessor 16 is coupled to the digital controller 14 over a microprocessor bus 36 which also couples the microprocessor to the memory 18 and the liquid crystal display unit 20. The microprocessor 16 executes programs stored in the memory 18 and thus provides the intelligence of the system 10. The microprocessor 16 allows the telephone system 10 to perform the functions customarily performed by such systems. It also responds to requests for service by the telephone user when the telephone user takes the telephone handset 34 off-hook or activates the telephone unit 12 by depressing one of the keys of the keypad 26. Such microprocessors and the programs which they execute are also well known in the art.

The liquid crystal display unit 20 is coupled to the telephone unit 12 and the digital controller 14. It functions to provide a display of, for example, a telephone number being dialed, the telephone number of an incoming call or an indication of various telephone unit features selected by the user such as hands-free hold, speaker mute, et cetera.

Figure 2:
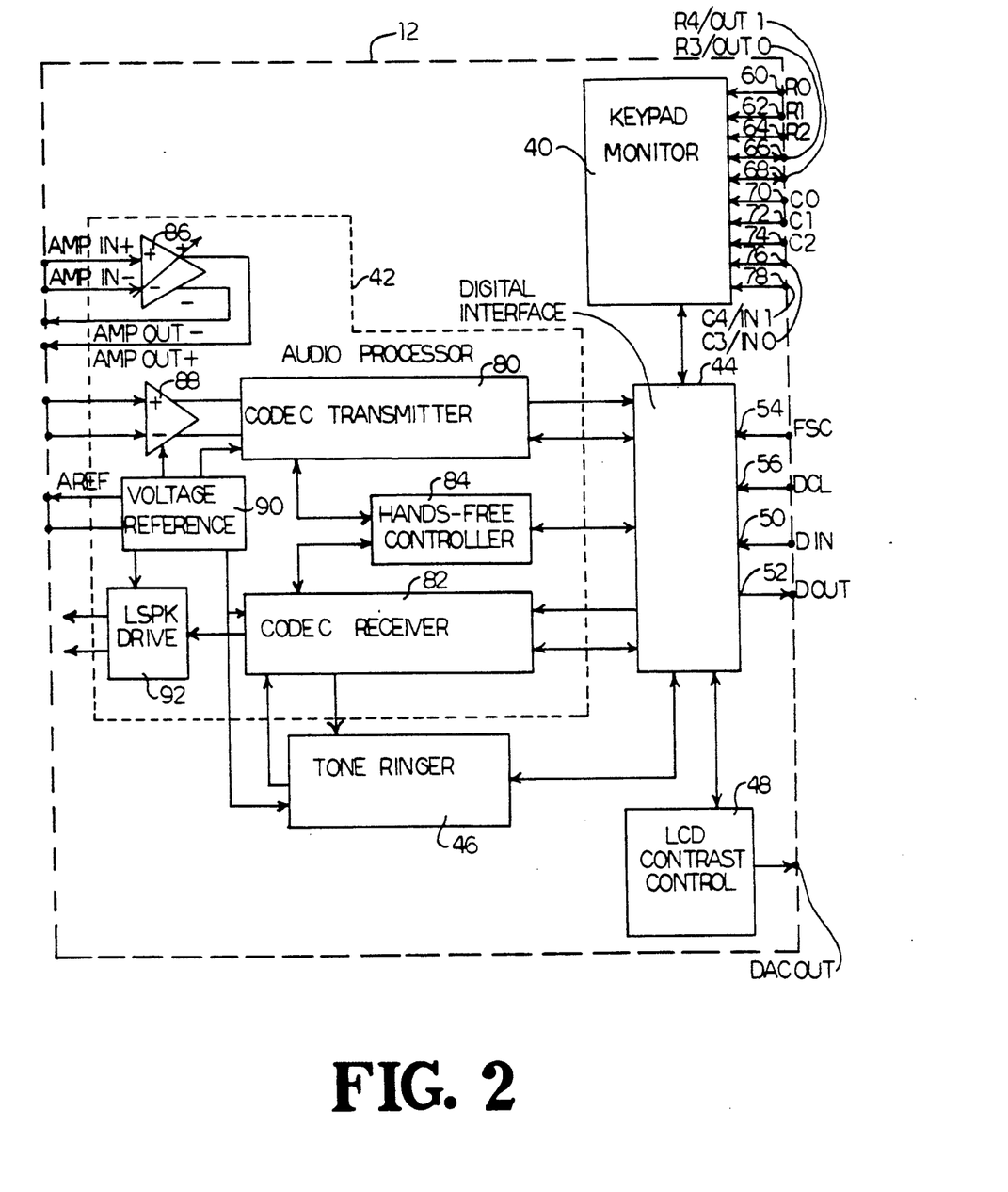
FIG. 2 is a block diagram of the hands-free, multiple feature telephone unit of FIG. 1 embodying the present invention.

Referring now to FIG. 2, it illustrates the telephone unit 12 in greater detail. The telephone unit 12 generally includes the key monitor 40 embodying the present invention, an audio processor 42, a digital interface 44, a tone ringer 46, and a liquid crystal display contrast control 48. The functional units of the telephone unit 12 are all integrated into a single integrated circuit chip to form the telephone unit 12.

The digital interface 44 provides a serial digital interface between the functional modules of the telephone unit 12 and the digital controller 14 over the four-conductor bus 32. The digital interface 44 includes an input 50 for receiving serial digital data from the digital controller 14 and an output 52 for conveying serial digital data to the digital controller 14. The digital data is conveyed between digital interface 44 of the telephone unit 12 and the digital controller 14 using a multiplexed channel comprising three repetitively conveyed thirty-two bit frames. The frame structure is well known in the art. Each frame comprises a plurality of channels which include serial digital representations of received or transmitted speech, data to be entered into register, data to be read from register, register addresses, keypad information such as a six-bit indication of a particular key being depressed, and other control information.

To provide synchronization for the data transfer, the digital interface 44 includes another input 54 (FSC) for receiving frame synchronizing signals at an 8 kilohertz rate from the digital controller 14 and an input 56 (DCL) for receiving clock signals at a 1.536 megahertz rate from the digital controller 14 for synchronizing the transmission and the reception of the individual bits of data.

In keeping with strict power requirements for such telephone units when not in use, the telephone unit 12 is in a deactivated state when not in use for conserving power. When no data is being transferred between the telephone unit 12 and the digital controller 14 or when the telephone unit 12 is deactivated, the data output 52 is held high. As will be seen hereinafter, the telephone unit 12 is activated when a keypad switch of the keypad is depressed or closed causing the keypad monitor 40 to provide an any key down indication. This causes the data output 52 to be pulled low to in turn cause the digital controller 14 to provide the aforementioned clock signals. Upon receipt of the clock signals, the telephone unit 12 is activated permitting the keypad monitor to scan its input terminals to determine which key is depressed. Also, at any other time data is to be transferred, the data output 52 is momentarily pulled low.

The keypad monitor 40 embodying the present invention includes a first plurality of inputs coupled to input terminal pins 60, 62, 64, 66 and 68 which are arranged to be coupled to a first plurality of keypad switch conductors (row conductors) and a second plurality of inputs coupled to input terminal pins 70, 72, 74, 76 and 78 which are arranged to be coupled to a second plurality of keypad switch conductors (column conductors). Since there are five inputs for row conductors and five inputs for column conductors, the keypad monitor, when operative in a first mode, is capable of monitoring a first set of input terminals including all of the input terminals and thus, is capable of monitoring a full-sized keypad comprising twenty-five keypad switches.

When the keypad monitor 40 is operative in a second mode, as will be more fully described hereinafter, the keypad monitor monitors a second set of input terminals, namely, input terminals 60, 62, 64, 70, 72 and 74. Hence, in the second mode, there are three row inputs and three column inputs for monitoring a keypad comprising nine keypad switches. Thus, the same physically configured keypad monitor 40 may be employed in a 5×5 keypad circuit (first mode of operation) or in a 3×3 keypad circuit (second mode of operation). When the keypad monitor is employed in a 3×3 keypad circuit (the second mode), terminal pins 66 and 68 are converted to general outputs, not associated with keypad monitoring, and terminal pins 76 and 78 are converted to general inputs, also not associated with keypad monitoring. As a result, when in the second mode, a third set of terminal pins comprising terminal pins 66, 68, 76, and 78 are not needed for keypad monitoring (since, in the second mode, only a 3×3 circuit is employed), but are converted to other uses to make full utilization of all of the integrated circuit terminal pins.

Each keypad switch is coupled between a respective different pair of row and column conductors. When a keypad switch is depressed or closed, the keypad monitor 40, after providing the aforementioned any key down indication and receiving the clock signals from the digital controller 14, then scans the input terminals and senses for a condition which indicates which keypad switch is closed. After detecting which keypad switch is closed, the monitor pauses to account for key bounce and then generates a 6-bit code representative of the keypad switch which is closed. The 6-bit code is conveyed to the digital interface 44 which then places the code into its proper channel and conveys the code to the digital controller 14 across the four-conductor bus 32 from the digital interface output 52.

The audio processor 42 includes a CODEC transmitter 80, a CODEC receiver 82, a hands-free controller 84, a variable gain amplifier 86, a fixed gain amplifier 88, a voltage reference 90, and a loudspeaker drive 92. The audio processor 42 thus provides all of the audio processing within the telephone unit 12.

The CODEC transmitter 80 receives analog voltages representative of audible speech from the fixed gain amplifier 88. The fixed gain amplifier 88 includes a pair of inputs which may be directly coupled to an external microphone 28 (FIG. 1) or coupled to the external microphone 28 (FIG. 1) through the variable gain amplifier 86. Preferably, the microphone is capacitively coupled to the telephone unit 12 at the inputs of either the variable gain amplifier 86 or the fixed gain amplifier 88. If the variable gain amplifier 86 is utilized, its outputs should preferably be capacitively coupled to the inputs of the fixed gain amplifier 88 through external capacitors.

The CODEC transmitter 80 after receiving the audio voltages representative of human speech, digitizes the analog voltages into an 8-bit digital word and conveys the same to the digital interface 44. The digital interface 44 then serializes the digital word received from the CODEC transmitter and places the same into the appropriate channel for transmission to the digital controller from the output 52.

The CODEC receiver 82 includes a digital-to-analog converter which converts the 8-bit digital words received from the digital interface 44 representative of received human speech and converts the same to analog voltages. The received audio is received by the digital interface 44 at input 50 in serial bit format and converts the same to 8-bit parallel bit words for conversion to analog form by the CODEC receiver 82. The CODEC receiver 82 is coupled to the loudspeaker drive 92 which includes an amplifier for amplifying the analog voltages representative of received human speech. The loudspeaker drive 92 is adapted to be coupled to the external speaker 30 (FIG. 1) for reproducing the received audio.

The tone ringer 46 is coupled to the CODEC receiver 82. The tone ringer provides ringing tones in digital format which are also converted to analog form by the CODEC receiver. The analog voltages representative of the ringing tones are then conveyed to the loudspeaker drive 92 for reproduction by the external speaker coupled to the loudspeaker drive 92. The tone ringer 46 is preferably programmable by a register contained within the digital interface 44 to permit a plurality of different distinguishable rings to be produced by the tone ringer 46.

Lastly, the liquid crystal display contrast control 48 provides an output voltage for the liquid crystal display 20 (FIG. 1) to adjust the contrast thereof. The liquid crystal display contrast control 48 is coupled to the digital interface 44 and is controllable by a register within the digital interface 44 which may be programmed through the 4-conductor bus 32.

The hands-free controller 84 is coupled between the CODEC transmitter 80 and CODEC receiver 82. The hands-free controller 84 controls the enablement of the CODEC transformer and CODEC receiver to provide hands-free simplex operation of the telephone unit 12. The hands-free controller 84 is coupled to the digital interface 44 for receiving control signals therefrom.

Figure 3:
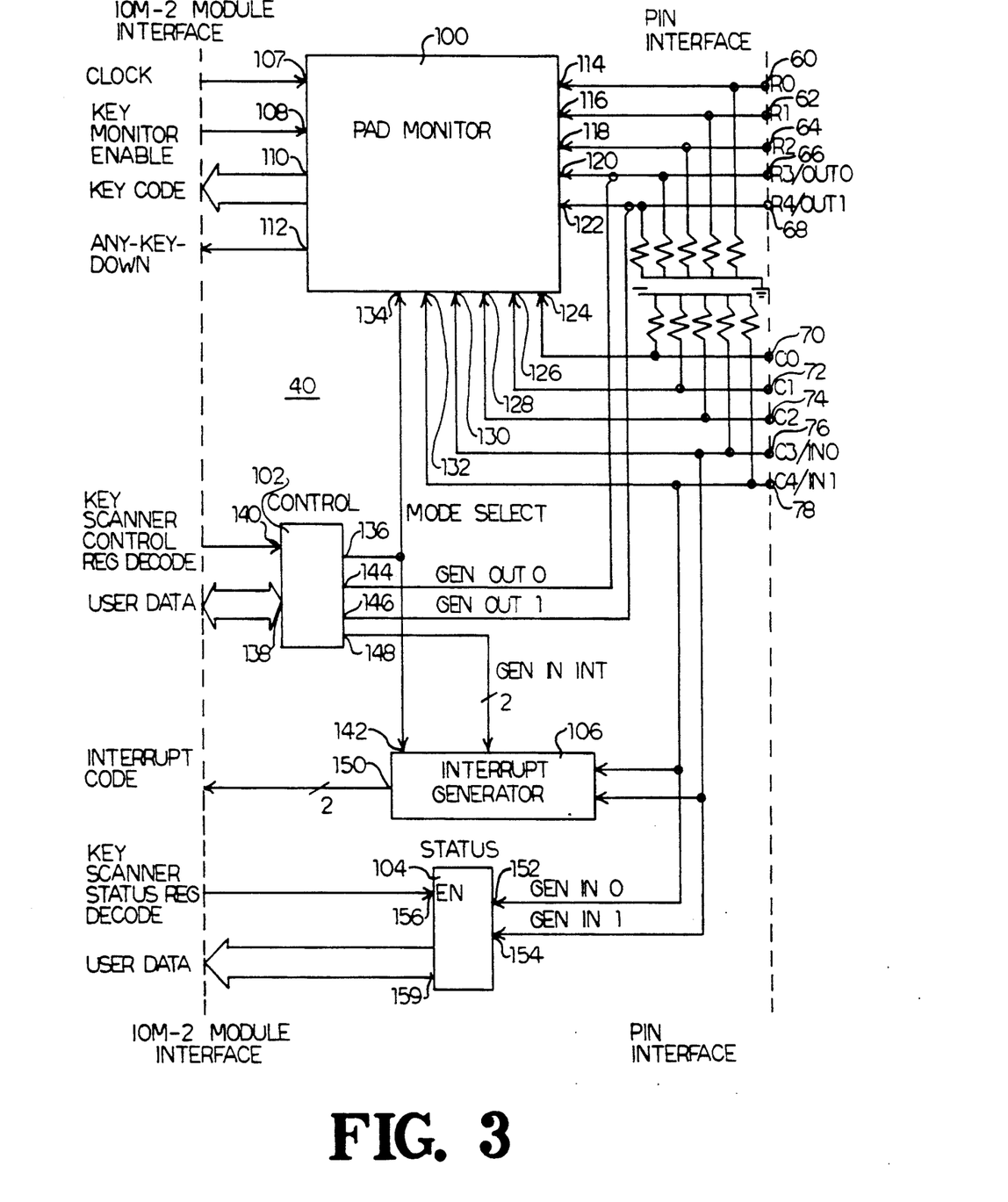
FIG. 3 is a block diagram of a keypad monitor embodying the present invention incorporated into the hands-free, multiple feature telephone unit of FIG. 2.

Referring now to FIG. 3, it illustrates the keypad monitor 40 in greater detail. The keypad monitor 40 generally includes keypad monitor logic 100, a control register 102, a status register 104, and an interrupt message generator 106.

The keypad monitor logic 100 includes a clock input 107 for receiving clock signals from the digital interface 44, a key monitor enable input 108 for receiving enable signals from the digital interface 44, an output 110 for providing the digital interface 44 with the 6-bit digital representation of a keypad switch being closed, and another output 112 for providing the digital interface 44 with the aforementioned any key down indication. The keypad monitor also includes the first plurality of inputs 114, 116, 118, 120, and 122 which are coupled to terminal input pins 60, 62, 64, 66, and 68 respectively. The keypad monitor logic also includes the second plurality of inputs 124, 126, 128, 130, and 132 which are coupled to the input terminal pins 70, 72, 74, 76, and 78, respectively. Lastly, the keypad monitor logic includes an input 134 which is coupled to the output 136 of the control register 102 which controls whether the keypad monitor 40 is in the first or second mode of operation.

The control register 102 includes an input 138 for receiving programming data from the digital interface 44. The control register includes another input 140 for receiving the address of the control register to enable the control register to be properly programmed to set the keypad monitor into the first or second mode of operation. For example, when the first mode of operation is selected, the output 136 will provide a high level to input 134 of the keypad monitor logic and a high level to an input 142 of the interrupt generator 106. When the keypad monitor is to operate in the second mode, the control register 102 will provide at output 136 a low level to input 134 of the keypad monitor logic and to the input 142 of the interrupt generator 106.

The control register 102 includes another output 144 coupled to input 120 of the keypad monitor logic and an output 146 coupled to input 122 of the keypad monitor logic. These outputs 144, 146, when the keypad monitor is operative in the second mode, cooperate with output 136 to establish terminal pins 66, 68 as general output pins for driving TTL loads, as will be described hereinafter in greater detail in connection with FIG. 6.

The control register includes a further output 148 which is coupled to the interrupt generator 106. The output 148 allows the interrupt generator 106 to be enabled when the keypad monitor is in the second mode of operation to permit the interrupt generator 106 to generate interrupt messages responsive to the input conditions at pins 76 and 78. If during the second mode of operation the input pins 76 and 78 are to be used for purposes other than to generate interrupt messages, the interrupt generator 106 would not be enabled by the output 148. The interrupt generator 106 has an output 150 for providing the generated interrupt messages. The output 150 is coupled to the digital interface 44 to convey the interrupt messages to the digital controller 14 and the microprocessor 16.

The status register 104 includes a pair of inputs 152 and 154 coupled to terminals 76 and 78 respectively. The status generator 104 also includes an input 156 for receiving its address and enabling the status register to provide status information as to the condition of pins 76 and 78 over an output 159. The output 159 is coupled to the digital interface 44 so that the status of the status register 104 may be read by the microprocessor 16.

Figure 4:
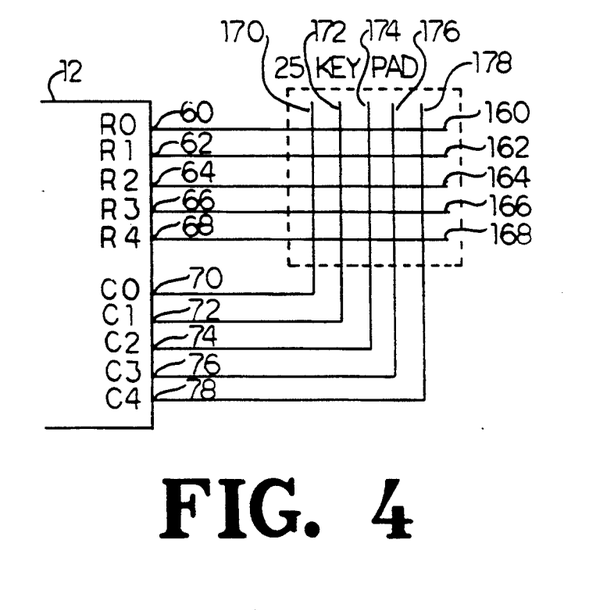
FIG. 4 is a simplified block diagram illustrating the use of the input terminal pins of the keypad monitor of FIG. 3 when operating in a first mode.

Referring now to FIG. 4, it illustrates the manner in which the keypad monitor of the telephone unit 12 is coupled to a keypad comprising twenty-five keypad switches when operative in the first mode of operation. As will be noted in FIG. 4, each of the row input terminal pins 60, 62, 64, 66, and 68 is coupled to a row conductor 160, 162, 164, 166, and 168 respectively. Similarly, each column terminal input pin 70, 72, 74, 76, and 78 is coupled to a respective one of the column conductors 170, 172, 174, 176, and 178. As configured in this manner, the keypad monitor of the telephone unit 12 is capable of supporting a keypad having twenty-five keypad switches.

Figure 5:
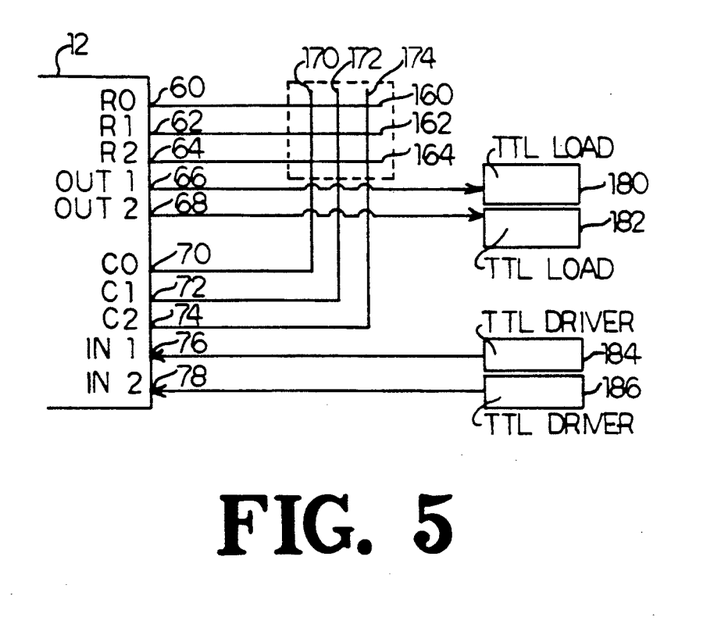
FIG. 5 is a simplified block diagram illustrating the use of the input terminal pins of the keypad monitor of FIG. 3 when operating in a second mode.

Referring now to FIG. 5, it illustrates the manner in which the keypad monitor of the telephone unit 12 is coupled to a keypad comprising nine keypad switches when operative in the second mode of operation. It will be noted that in FIG. 5, each of the row terminal input pins 60, 62, and 64, is coupled to a respective one of the row conductors 160, 162, and 164. Similarly, each of the column input terminal pins 70, 72, and 74 is coupled to a respective one of the column conductors 170, 172, and 174. The terminal pins 66 and 68 are converted for general output purposes and are coupled to TTL loads 180 and 182. Pins 76 and 78 are coupled to TTL drivers 184 and 186 and thus serve as general purpose input pins. Hence, when the keypad monitor of the present invention is rendered operative in the second mode, the third set of terminal pins including terminal pins 66 and 68 are converted for general output purposes, and terminal pins 76 and 78 are converted for general input purposes, not associated with the monitoring of the keypad.

Figure 6:
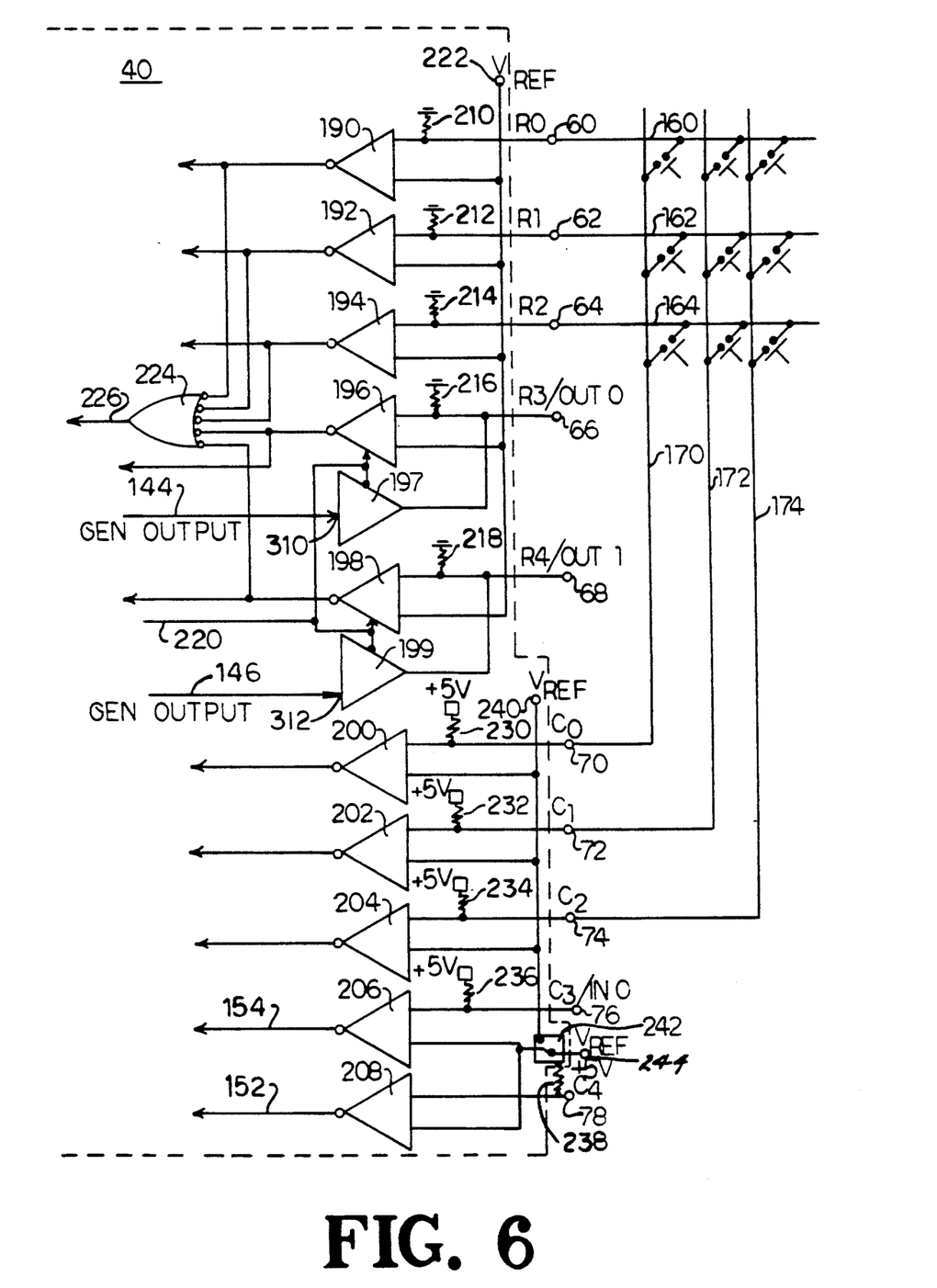
FIG. 6 is a schematic circuit diagram illustrating the circuitry of the keypad monitor of FIG. 3 which may be used for sensing the condition across the keypad switches and for converting the use of certain input terminal pins during the second mode of operation for a use independent of the keypad monitoring function.

Referring now to FIG. 6, it illustrates in greater detail the keypad monitor 40 when operative in the second mode of operation. The keypad monitor includes a plurality of sense amplifiers 190, 192, 194, 196, 198, 200, 202, 204, 206, and 208. The sense amplifiers 190, 192, and 194 include a first input coupled to the row conductors 160, 162, and 164 respectively and to ground potential through internal pull down resistors 210, 212, and 214 respectively. Sense amplifiers 196 and 198 also have a first input coupled to terminal pins 66 and 68 respectively and to ground potential through pull down resistors 216 and 218, respectively. However, it will be noted, that terminal pins 66 and 68 are not coupled to any row conductors.

Associated with sense amplifiers 196 and 198 are sense amplifiers 197 and 199 respectively. Sense amplifiers 197 and 199 each include an input 310, 312 which is coupled to a general purpose output for receiving a general purpose output signal from control register 102 (see FIG. 3) via lines 144, 146. When the keypad monitor is rendered in the second mode, a logical zero is impressed upon mode select line 220 which is coupled to the output 136 of the control register 102 (FIG. 3) which disables sense amplifiers 196 and 198 and enables sense amplifiers 197 and 199. As a result, the terminal pins 66 and 68 are converted to general output pins for driving TTL loads 180 and 182 (FIG. 5).

It will also be noted that each of the sense amplifiers 190, 192, 194, 196, and 198 includes a second input which is coupled to a reference voltage at a terminal 222. The reference voltage is selected such that when one of the keypad switches is depressed or closed, a logical one is provided at the output of the sense amplifier coupled to the row of the switch which has been depressed. It will also be noted that the outputs of the sense amplifiers are all coupled to an input of an OR gate 224. Hence, when one of the key switches of the keypad is depressed, OR gate 224 will provide at an output 226 to provide the any key down indication previously described.

Sense amplifiers 200, 202, and 204 each include a first input which is coupled to one of the keypad column conductors 170, 172, and 174 and to a +5 volts through internal pull up resistors 230, 232, and 234. Sense amplifiers 206 and 208 also include a first input which is coupled to a +5 volts through an internal pull up resistor 236 and 238 and are also coupled to the column input terminal pins 76 and 78 which are not coupled to any column lines. Sense amplifiers 200, 202, and 204 have a second input coupled to a voltage reference at a terminal 240 which is equal to the reference voltage supplied at terminal 222. When a keypad switch is depressed, the sense amplifier coupled to the column line which is in turn coupled to the closed keypad switch will provide a logical one output. A logical one output of one of the column sense amplifiers 200, 202, and 204 and the logical one output provided by one of the row sense amplifiers 190, 192, or 194 are sensed by the keypad monitor as it scans and used to generate the 6-bit code indicating which keypad switch is closed in a manner well-known in the art.

It will also be noted that sense amplifiers 206 and 208 include a second input coupled to a switch 242 which may be a solid state switch. One pole of the switch 242 is coupled to the reference potential terminal 240 and the other pole of the switch is coupled to another reference potential terminal 244. When the keypad monitor is operative in the second mode, the low logic level on the mode select line 220 causes the switch 242 to select the reference potential at terminal 244. By doing so, the second inputs of the sense amplifiers 206 and 208 are coupled to a different reference potential for sensing high or low TTL levels at their respective first inputs coupled to terminals 76 and 78. In this manner, the terminals 76 and 78 are converted for general input purposes and are coupled to TTL drivers 184 and 186 as illustrated in FIG. 5.

Figure 7:
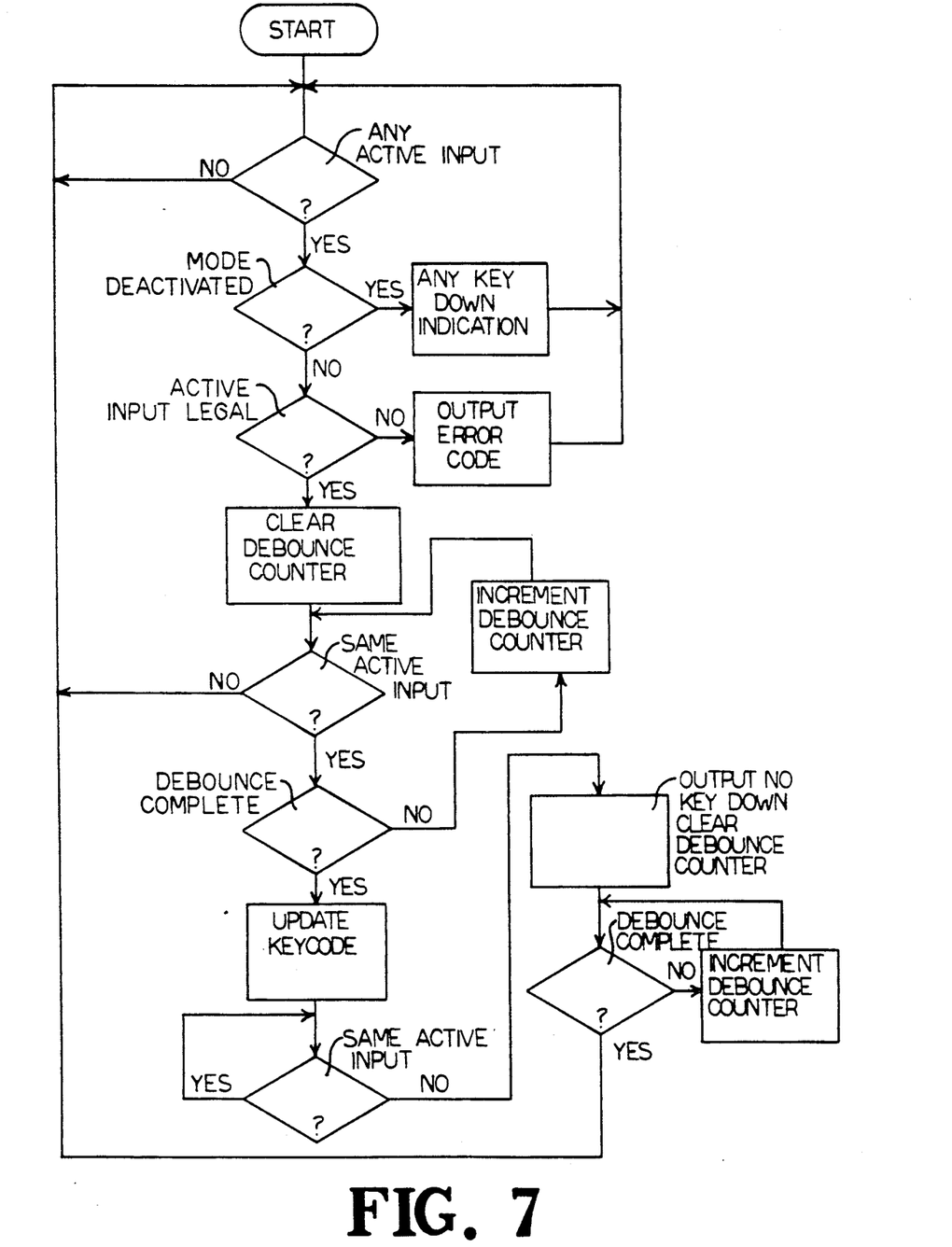
FIG. 7 is a flow diagram illustrating the manner in which the keypad monitor of FIG. 3 may be implemented for monitoring a plurality of keypad switches.

Referring now to FIG. 7, it illustrates the manner in which the keypad monitor may be implemented for activating the digital interface and indicating the current condition of the keypad switches. The keypad monitor begins at start in step 250. It first determines in step 252 if a key has been depressed. If not, the keypad monitor will return to start. If a key has been depressed, the keypad monitor then in step 256 then determines if it is in the deactivated mode. If it is, the keypad monitor then in step 258 provides the any key down indication to be conveyed to the digital interface 44 to cause the digital controller 14 to provide clock pulses to the telephone unit 12 over the bus 32. The keypad monitor then returns to start If the key is still depressed, the keypad monitor will sense that the key is depressed in step 252, and then determine in step 256 that it is not in the deactivated mode. The keypad monitor then clears the debounce counter in step 264. The debounce counter provides a delay time for the keypad switch being depressed to be stabilized and to dissipate any transients that may be occurring within the keypad.

The keypad monitor then in step 266 determines if the keypad switch currently depressed is the same active input as originally detected. If not, the keypad monitor returns to start. If it is the same active input, the keypad monitor then determines in step 268 if the debounce period has been completed. If not, the keypad monitor in step 270 increments the debounce counter and then returns to step 266. When the debounce counter is incremented a sufficient number of times to indicate that the debounce time period has been completed, the keypad monitor will detect in step 268 that the debounce time period has been completed and then proceeds to step 272 to update the key code. When updating the key code, the keypad monitor provides a 6-bit indication of the particular key being depressed.

After updating the key code, the keypad monitor then determines if the same key is still being depressed in step 274. The keypad monitor continuously repeats step 274 until the same key is no longer being depressed. When the key is no longer being depressed, the keypad monitor will output a 6-bit code indicating that no key is being depressed. This no key down output is a 6-bit code, and will clear the debounce counter in step 276. The keypad monitor then in step 278 determines if the debounce time period has completed. If not, the keypad monitor in step 280 increments the debounce counter and returns to step 278 to determine if the debounce time period has completed. Once the debounce time period has completed, the keypad monitor returns to start to detect the depression of another keypad switch.

Hence, from the foregoing, it can be seen that the keypad monitor provides a 6-bit code indicating that no key is down, a 6-bit code indicating an error when the input is illegal, a 6-bit code indicating which keypad switch is depressed, and a separate indication of an any key down indication to activate the interface 44 for receiving clock signals from the digital controller 14.

After receiving the clock signals from the digital controller 14, the keypad monitor then determines which key is depressed as described above. Before providing the 6-bit code indicating the particular key being depressed, the keypad monitor provides a debounce time period and after the keypad switch is opened, the keypad monitor provides another debounce time period. If two keys are being depressed simultaneously, the keypad monitor generates a 6-bit error code to inform the microprocessor 16 that it should disregard the keypad switch closure. Also, when no key is depressed, the keypad monitor provides a 6-bit no key down code to the interface 44.

While a particular embodiment of the present invention has been shown and described, modifications may be made, and it is therefore intended to cover in the appended claims all such changes and modifications which fall within the true spirit and scope of the invention.

What is claimed is:

1. A keypad monitor for monitoring the closure of a plurality of keypad switches arranged between a plurality of first conductors and a plurality of second conductors, said keypad monitor being implemented in an integrated circuit including a plurality of monitor input terminals with each said monitor input terminal being arranged to be coupled to a respective different one of said first and second conductors, said keypad monitor comprising:
   means for providing a digital representation corresponding to the closure of any one of said plurality of keypad switches;
   mode select means for selecting a first or a second monitor operating mode;
   means for coupling a first predetermined number of said monitor input terminals to said means for providing a digital representation in response to said mode select means selecting said first mode, and, responsive to said mode select means selecting said second mode for coupling a second predetermined number of monitor input terminals to said means for providing a digital representation and configuring a third predetermined number of said monitor input terminals as dedicated general outputs and dedicated general inputs, at least one of said third predetermined number of said monitor input terminals being one of said first predetermined number of said monitor input terminals when said mode select means selects said first monitor operating mode.

2. A keypad monitor as defined in claim 1 wherein said means for coupling includes input sense amplifiers coupled to each of said monitor input terminals.

3. A keypad monitor as defined in claim 2 further comprising means for providing reference voltages coupled to said input sense amplifiers and providing a first reference voltage to each of said third predetermined number of monitor input terminals configurable as general inputs when said mode select means selects said first mode and providing a second reference voltage to each of said third predetermined number of monitor input terminals configurable as general inputs when said mode select means selects said second mode.

4. A keypad monitor as defined in claim 3 wherein said first reference voltage enables the sensing of the high and low voltages produced by the opening and closure of each of said plurality of keypad switches and said second reference voltage enables the sensing of high and low TTL voltage levels at said monitor input terminals configured as general inputs.

5. A keypad monitor as defined in claim 2 further comprising output sense amplifiers coupled to each of said third predetermined number of monitor input terminals configurable as general outputs.

6. A keypad monitor as defined in claim 5 wherein said output sense amplifiers provide TTL output voltage levels at said monitor input terminals configured as general outputs.

7. A keypad monitor apparatus for monitoring closure of a plurality of keypad switches, said plurality of keypad switches being arrayed in a matrix having m rows and n columns, said plurality of keypad switches being disposed between a plurality of first conductors and a plurality of second conductors; closure of a respective keypad switch of said plurality of keypad switches being detectable among said plurality of first conductors and said plurality of second conductors; the apparatus presenting a plurality of terminals, each respective conductor of said plurality of first conductors and said plurality of second conductors being coupled with a respective one terminal of said plurality of terminals; the apparatus comprising:

a decoding means for generating a digital representation for said closure of any said respective keypad switch of said plurality of keypad switches;

a mode select means for setting the apparatus for operating in a first mode or a second mode;

a selective configuring means operatively connected with said mode select means and with said decoding means and responsive to said mode select means for configuring selected terminals of said plurality of terminals for cooperation with said decoding means to receive said digital representation; said selective configuring means effecting said configuring of a first set of said selected terminals when the apparatus is set for operating in said first mode, said selective configuring means effecting said configuring of a second set of said selected terminals when the apparatus is set for operating in said second mode; said first set of said selected terminals being configured for establishing connection between said decoding means and m rows and n columns of said matrix; said second selected terminals being configured for establishing connection between said decoding means and (m-a) rows and (n-b) columns of said matrix; said a rows and said b columns of said matrix being configured as dedicated input connections and dedicated output connections when the apparatus is set for operating in said second mode.

* * * * *